(12) United States Patent
Watari et al.

(10) Patent No.: US 11,136,442 B2
(45) Date of Patent: Oct. 5, 2021

(54) PREPREG AND FIBER REINFORCED COMPOSITE MATERIAL

(71) Applicant: TORAY INDUSTRIES, INC., Tokyo (JP)

(72) Inventors: Ryohei Watari, Iyo-gun (JP); Narumichi Sato, Iyo-gun (JP); Andrew Hideo Koyanagi, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 127 days.

(21) Appl. No.: 16/485,219

(22) PCT Filed: Mar. 27, 2018

(86) PCT No.: PCT/JP2018/012307
§ 371 (c)(1),
(2) Date: Aug. 12, 2019

(87) PCT Pub. No.: WO2018/181254
PCT Pub. Date: Oct. 4, 2018

(65) Prior Publication Data
US 2020/0010632 A1    Jan. 9, 2020

(30) Foreign Application Priority Data

Mar. 29, 2017   (JP) .............................. JP2017-065230

(51) Int. Cl.
*C08J 5/24*        (2006.01)
*B29B 15/10*       (2006.01)
*B32B 5/26*        (2006.01)

(52) U.S. Cl.
CPC ............... *C08J 5/24* (2013.01); *B29B 15/105* (2013.01); *B32B 5/26* (2013.01); *B32B 2260/046* (2013.01); *C08J 2363/00* (2013.01)

(58) Field of Classification Search
CPC ........... C08J 5/24; C08J 2363/00; B32B 5/26; B32B 2260/046
See application file for complete search history.

(56) References Cited

U.S. PATENT DOCUMENTS

| | | | |
|---|---|---|---|
| 2010/0098906 A1 | 4/2010 | Bongiovanni et al. | |
| 2014/0087178 A1* | 3/2014 | Arai ........................ | C08J 5/24 428/327 |

(Continued)

FOREIGN PATENT DOCUMENTS

| | | |
|---|---|---|
| JP | 2004-263086 A | 9/2004 |
| JP | 2007-98818 A | 4/2007 |

(Continued)

OTHER PUBLICATIONS

International Search Report, issued in PCT/JP2018/012307, PCT/ISA/210, dated Jun. 19, 2018.

(Continued)

*Primary Examiner* — Jeremy R Pierce
(74) *Attorney, Agent, or Firm* — Birch, Stewart, Kolasch & Birch, LLP (57) ABSTRACT

The objective of the present invention is to provide a prepreg and a fiber reinforced composite material using this prepreg. This prepreg has good handleability, is suitable for producing a reinforced composite material in a short-time and without using an autoclave, and is capable of yielding a fiber reinforced composite material exhibiting excellent impact resistance, wherein the occurrence of voids has been suppressed. To attain the objective, this prepreg comprises a reinforced fiber [A] that is layered and partially impregnated with an epoxy resin composition containing an epoxy resin [B] and a hardener [C], the impregnation rate φ being 30 to 95%. In this prepreg, a thermoplastic resin [D] insoluble in the epoxy resin [B] is distributed unevenly over a surface on one side of the prepreg, and a portion not impregnated with (Continued)

the epoxy resin composition is localized in the layer of the reinforced fiber [A] on the side where the thermoplastic resin [D] is distributed unevenly. This prepreg has a localization parameter σ, which defines the degree of the localization to be in the range of $0.10<\sigma<0.45$.

5 Claims, 4 Drawing Sheets

(56) References Cited

U.S. PATENT DOCUMENTS

| | | |
|---|---|---|
| 2014/0309336 A1 | 10/2014 | Hughes et al. |
| 2015/0344686 A1* | 12/2015 | Shimizu .................... C08J 5/24 523/468 |
| 2017/0283571 A1 | 10/2017 | Taketa et al. |

FOREIGN PATENT DOCUMENTS

| | | |
|---|---|---|
| JP | 2008-255234 A | 10/2008 |
| JP | 2012-506454 A | 3/2012 |
| JP | 2014-524940 A | 9/2014 |
| JP | 2015-515502 A | 5/2015 |
| JP | 2017-179357 A | 10/2017 |
| JP | 2017-226106 A | 12/2017 |
| WO | WO 2016/043156 A1 | 3/2016 |

OTHER PUBLICATIONS

Written Opinion of the International Searching Authority, issued in PCT/JP2018/012307, PCT/ISA/237, dated Jun. 19, 2018.

* cited by examiner

PREPREG AND FIBER REINFORCED COMPOSITE MATERIAL

TECHNICAL FIELD

The present invention relates to a prepreg and a fiber reinforced composite material.

BACKGROUND ART

Fiber reinforced composite materials that contain reinforced fibers such as carbon fibers and glass fibers and also contain a matrix resin are light in weight, yet excellent in mechanical properties such as strength and stiffness, heat resistance, and corrosion resistance. Therefore, fiber reinforced composite materials have been applied to many fields, such as aerospace, cars, rail cars, ships, civil engineering and construction, and sports equipment. Above all, members for aircraft such as passenger aircraft and regional jets, and members for spacecraft such as artificial satellites, rockets, and space shuttles are required to have particularly excellent mechanical properties and heat resistance. Therefore, in these applications, carbon fibers that are lightweight and highly stiff are often used as reinforced fibers, and thermosetting resins excellent in heat resistance, elastic modulus, and chemical resistance, such as epoxy resins, are often used as matrix resins.

A main cause of deterioration of the mechanical properties of fiber reinforced composite materials is the presence of defects such as voids inside the fiber reinforced composite materials. When a mechanical load is applied to a fiber reinforced composite material including voids, damages such as crack and delamination are likely to occur, and these damages lower the mechanical strength and stiffness. Therefore, many studies have been made on materials/molding techniques to suppress void growth.

Among methods for producing fiber reinforced composite materials, autoclave molding is a molding method that can particularly suppress the generation of voids. This molding method can reduce the size of voids since the method can thermally cure the resin while applying external pressure to the material. Moreover, the molding method can significantly reduce the amount of voids since the method can suppress the vaporization of volatiles contained in the matrix resin. In an autoclave molding, however, a large initial investment is required to install the pressure vessel (autoclave) that can withstand high pressure. This is a main cause of the high cost for a technique intended for application to members for aerospace that are small in production volume.

Therefore, there have been proposed out-of-autoclave processes in which only a vacuum pump and an oven are used and no expensive pressurizing equipment such as an autoclave is used. In conventional out-of-autoclave processes, however, since volatiles in the epoxy resin are easily vaporized during heating, it is necessary to place the material under vacuum in a preheated state (for example, 60 to 120° C.) for a long duration to remove the volatiles. Therefore, compared with the conventional autoclave molding, the out-of-autoclave process has problems that the molding time is long, voids tend to be left, and the failure rate is high.

As a means for solving such problems, Patent Document 1 proposes a semi-impregnated prepreg having unfilled regions for releasing volatiles and trapped air in the prepreg. The unfilled regions are formed by suppressing impregnation of the reinforced fiber layer with the matrix resin to provide un-impregnated regions inside the prepreg. Use of this technique can eliminate volatiles and trapped air that are the cause of generation of voids through the unfilled regions, and can produce a fiber reinforced composite material with few voids in a short time, even in the case of molding in an atmospheric pressure environment using only a vacuum pump and an oven without using an autoclave.

Moreover, Patent Document 2 proposes, as for a fiber reinforced composite material for aircraft/spacecraft, an interlayer toughening technique. In the interlayer toughening technique, a tough thermoplastic resin is shifted to a space between fiber layers to significantly improve the impact resistance. In actual operation of aircraft and spacecraft, there is a problem of damages caused by impact such as collision with birds or hail. Use of the interlayer toughening technique as described above, however, can significantly increase the impact strength of the fiber reinforced composite material.

PRIOR ART DOCUMENTS

Patent Documents

Patent Document 1: U.S. Pat. No. 6,139,942
Patent Document 2: Japanese Patent Laid-open Publication No. 10-231372

SUMMARY OF THE INVENTION

Problems to be Solved by the Invention

However, even in the case where the semi-impregnated prepreg described in Patent Document 1 is used, it is necessary to provide large un-impregnated regions to ensure the continuity of the unfilled regions in order to efficiently remove volatiles and reduce the frequency of void generation. However, if the un-impregnated regions are too large, in cutting the prepreg, there may be problems that the reinforced fibers are fluffed up from the cut surface, or the prepreg is torn in the out-of-plane direction, leading to deteriorated handleability of the prepreg. More specifically, there is a trade-off relationship between the reduction of possibility of void generation and the handleability of the prepreg, and a means for simultaneously solving these problems has not been proposed.

Further, the thermoplastic resin disposed between the layers as described in Patent Document 2 is generally in a solid or viscous state at the molding temperature. As a result, the technique has a problem that movement of the matrix resin (hereinafter referred to as "flow") is less likely to occur during molding, and that the resin is likely to be cured without impregnating into the unfilled regions included in the laminate of prepregs, causing a large number of voids.

In view of such background art, an object of the present invention is to provide a prepreg that is suitable for producing a fiber reinforced composite material without using an autoclave in a short molding time, that is capable of suppressing void growth, that is capable of providing a fiber reinforced composite material that exhibits excellent impact resistance, and that is excellent in handleability, and to provide a fiber reinforced composite material including the prepreg.

Solutions to the Problems

The inventors of the present invention intensively studied to solve the above-mentioned problems, and as a result, found the following matter: shifting un-impregnated regions of a reinforced fiber layer of a prepreg to one side of the prepreg, particularly on the side where a thermoplastic resin is disposed, significantly increases the continuity of the un-impregnated regions, so that air trapped at the time of lamination and volatiles contained in the matrix resin can be efficiently removed out of the laminate of prepregs. The inventors of the present invention also found that as a result, even in the case of a prepreg having small un-impregnated regions, it is possible to fabricate a fiber reinforced composite material having a small amount of voids and excellent in impact resistance in a short molding time. Based on such findings, the present invention adopts the following means. That is, the prepreg of the present invention is a prepreg including: reinforced fibers [A] arranged in a layer form, an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at a surface on one side of the prepreg. The prepreg has a degree of impregnation φ with the epoxy resin composition of 30 to 95%, in a layer of the reinforced fibers [A], a region un-impregnated with the epoxy resin composition shifts to the side where the thermoplastic resin [D] is localized, and the prepreg has a shift parameter σ that defines a degree of the shift in a range of $0.10<\sigma<0.45$.

Moreover, the fiber reinforced composite material of the present invention is a cured product of the above-mentioned prepreg.

Effects of the Invention

The prepreg of the present invention is suitable for producing a fiber reinforced composite material without using an autoclave in a short time, capable of suppressing generation of voids, capable of providing a fiber reinforced composite material that exhibits excellent impact resistance, and excellent in handleability.

The fiber reinforced composite material of the present invention suppresses the generation of voids and exhibits excellent impact resistance.

EMBODIMENTS OF THE INVENTION

The prepreg of the present invention is a prepreg including: reinforced fibers [A] arranged in a layer form, an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at a surface on one side of the prepreg. The prepreg has a degree of impregnation φ with the epoxy resin composition of 30 to 95%, in a layer of the reinforced fibers [A], a region un-impregnated with the epoxy resin composition shifts to the side where the thermoplastic resin [D] is localized, and the prepreg has a shift parameter σ that defines a degree of the shift in a range of $0.10<\sigma<0.45$.

The reinforced fibers [A] used in the present invention may be any of glass fibers, Kevlar fibers, carbon fibers, graphite fibers, boron fibers and the like. Among them, carbon fibers that are excellent in specific strength and specific elastic modulus are preferable in order to obtain a particularly high weight reduction effect.

As for the prepreg of the present invention, it is one of preferable aspects that the reinforced fibers [A] be continuous fibers that are arranged unidirectionally. Use of continuous fibers makes it possible to exhibit high mechanical strength compared to the case where short cut fibers are used. Furthermore, use of unidirectionally arranged fibers can provide a fiber reinforced composite material having a high fiber content and excellent in strength and stiffness. In the present invention, the phrase "arranged unidirectionally" means that in the observation of a surface of the prepreg with an optical microscope, 90% or more of all the fibers satisfy $\Theta-10°<\theta<\Theta+10°$, where θ is the orientation angle of each fiber, and Θ is the average of the orientation angles. In the calculation of the average value, a field of view of 0.5 mm is observed with an optical microscope, 30 fibers are arbitrarily selected from the fibers included in the field of view, and the average of the orientation angles of the fibers is used. Furthermore, the term "continuous fibers" in the present invention means reinforced fibers having a length capable of exhibiting high strength, and specifically means reinforced fibers of 10 cm or more. The phrase "continuous fibers that are arranged unidirectionally" encompasses unidirectional fabrics in which reinforced fibers are stitched together in the width direction using an auxiliary yarn.

As for the prepreg of the present invention, it is another preferable aspect that the reinforced fibers [A] be in the form of a woven fabric. Use of a woven fabric base material makes the base material itself easily deformable in the in-plane direction, and makes the base material easily shaped even into a shape having three-dimensional unevenness. Examples of the woven fabric form include bidirectional fabrics, multiaxial woven fabrics, knitted fabrics, and braided materials.

In still another preferable aspect of the prepreg of the present invention, the reinforced fibers [A] are a sheet-like short fiber base material. The short fiber base material is easier to stretch than the woven fabric base material is, and easier to shape into a shape that is more complicated three-dimensionally. Examples of the short fiber base material include nonwoven fabrics, mats, and sheet molding compounds. The reinforced fibers included in this aspect have a length of 12 mm or more, preferably 25 mm or more, when priority is given to mechanical strength. This is because such longer reinforced fibers more easily exhibit high mechanical strength than reinforced fibers having a length less than 12 mm. When priority is given to stretchability of the base material, the fiber length is preferably 25 mm or less, more preferably 12 mm or less. These preferable aspects can be suitably selected according to the targeted application.

The epoxy resin [B] included in the present invention may be any epoxy resin as long as it has one or more glycidyl groups, but the epoxy resin [B] preferably has two or more glycidyl groups in one molecule. In the case of an epoxy resin having two or more glycidyl groups in one molecule, a cured product obtained by thermally curing a mixture of the epoxy resin and a hardener described later (hereinafter, the mixture is referred to as "epoxy resin composition") has a higher glass transition temperature than that of a cured product of an epoxy resin having one glycidyl group.

Examples of the epoxy resin that can be used in the present invention include bisphenol epoxy resins such as bisphenol A epoxy resin, bisphenol F epoxy resin, bisphenol AD epoxy resin, and bisphenol S epoxy resin, brominated epoxy resins such as tetrabromobisphenol A diglycidyl ether, an epoxy resin having a biphenyl skeleton, an epoxy resin having a naphthalene group, an epoxy resin having a dicyclopentadiene skeleton, novolac epoxy resins such as phenol novolac epoxy resin and cresol novolac epoxy resin, and glycidyl amine epoxy resins such as diaminodiphenylmethane epoxy resin, diaminodiphenyl sulfone epoxy resin, aminophenol epoxy resin, metaxylenediamine epoxy resin, 1,3-bis(aminomethyl)cyclohexane epoxy resin, and isocyanurate epoxy resin. Among them, an epoxy resin having three or more glycidyl groups in one molecule is preferable because it can exhibit a higher glass transition temperature and a higher elastic modulus.

These epoxy resins may be used singly, or as a mixture of a plurality of epoxy resins. In the case where a plurality of epoxy resins are used as a mixture, it is effective for controlling the fluidity of the matrix resin during molding into the prepreg to mix, for example, an epoxy resin that exhibits fluidity at any temperature equal to or lower than the curing start temperature of the epoxy resin composition with an epoxy resin that does not exhibit fluidity at the temperature. In the case where the fluidity is not controlled, for example, if the matrix resin before being gelated exhibits high fluidity during molding into the prepreg, orientation of the reinforced fibers may be disturbed, or the matrix resin may flow out of the reinforced fiber layer, so that the fiber mass content may be excessively lowered and the mechanical properties of the obtained fiber reinforced composite material may be deteriorated. Combining a plurality of kinds of epoxy resins exhibiting various viscoelastic behaviors at some temperature is also effective for appropriately controlling the tackiness (adhesiveness) and drapability of the obtained prepreg.

In the present invention, it is also effective to mix a thermoplastic resin compatible with the epoxy resin [B] in the epoxy resin. In particular, mixing a thermoplastic resin compatible with the epoxy resin [B] is effective for optimizing the tackiness of the obtained prepreg, controlling the fluidity of the matrix resin at the time of thermally curing the prepreg, and improving the toughness of the obtained fiber reinforced composite material. Such thermoplastic resin is preferably a thermoplastic resin including a polyaryl ether skeleton. Examples of candidate thermoplastic resins including a polyaryl ether skeleton include polysulfones, polyphenylsulfones, polyethersulfones, polyetherimides, polyphenylene ethers, polyetheretherketones, and polyetherethersulfones. These thermoplastic resins including a polyaryl ether skeleton may also be used singly or in combination as appropriate. Among them, polyethersulfones and polyetherimides can be preferably used because they can impart toughness to the obtained fiber reinforced composite material without deteriorating the heat resistance and mechanical properties of the fiber reinforced composite material.

Moreover, in the thermoplastic resin including a polyaryl ether skeleton, it is effective to appropriately select the kind of a terminal functional group for controlling the compatibility and reactivity with the epoxy resin. Examples of selectable candidate terminal functional groups include primary amines, secondary amines, hydroxyl groups, carboxyl groups, thiol groups, acid anhydrides, and halogen groups (chlorine and bromine). In the case where a halogen group is selected among them as a terminal functional group, a prepreg excellent in preservation stability can be obtained because the halogen group has low reactivity with the epoxy resin. On the other hand, when it is desired to increase the reactivity with the epoxy resin and shorten the curing time of the epoxy resin composition, it is effective to select a functional group such as a primary amine, a secondary amine, a hydroxyl group, a carboxyl group, a thiol group, and an acid anhydride as the terminal functional group.

The hardener [C] included in the present invention may be any compound having an active group capable of undergoing a cross-linking reaction with a glycidyl group. For example, a compound having an amino group, an acid anhydride group, or an azido group is suitable for the hardener [C]. Specific examples of the hardener [C] include various isomers of dicyandiamide, diaminodiphenylmethane, and diaminodiphenyl sulfone, aminobenzoic acid esters, various acid anhydrides, phenol novolac resin, cresol novolac resin, polyphenols, imidazole derivatives, aliphatic amines, tetramethylguanidine, thiourea added amines, methyl hexahydrophthalic acid anhydrides, other carboxylic acid anhydrides, carboxylic acid hydrazides, carboxylic acid amides, polymercaptans, boron trifluoride ethylamine complexes, and other lewis complexes. These hardeners may be used singly or in combination.

Among them, use of an aromatic diamine as the hardener [C] can provide a cured resin good in heat resistance. In particular, various isomers of diaminodiphenyl sulfone are most suitable because they can provide a cured resin good in heat resistance. The amount of the aromatic diamine hardener added is preferably an amount such that the number of active hydrogen atoms in the aromatic amine compound is in the range of 0.7 to 1.3 with respect to one glycidyl group in the epoxy resin composition, and the amount is more preferably an amount such that the number of active hydrogen atoms is 0.8 to 1.2. Herein, "active hydrogen" refers to a hydrogen atom that binds to nitrogen, oxygen, and sulfur of an amino group, a hydroxyl group, and a thiol group in an organic compound. When the ratio of epoxy groups to active hydrogen atoms is within the predetermined range described above, a cured resin excellent in heat resistance and elastic modulus can be obtained.

In addition, in the prepreg of the present invention, the hardener [C] may contain a hardener aid in order that the prepreg may exhibit high heat resistance and water resistance while being cured at a relatively low temperature. Herein, the hardener aid does not directly react with the glycidyl group of the epoxy resin [B] to form a cross-linked structure, but accelerates the cross-linking reaction between the epoxy resin [B] and the hardener [C] as a catalyst. Examples of the hardener aid include urea compounds such as 3-phenol-1,1-dimethylurea, 3-(3-chlorophenyl)-1,1-dimethylurea, 3-(3,4-dichlorophenyl)-1,1-dimethylurea, 2,4-toluenebis(dimethylurea), and 2,6-toluenebis(dimethylurea).

In addition, if the epoxy resin composition containing the epoxy resin and the hardener (and optionally containing the hardener aid) has a low viscosity, and the prepreg has a problem in handleability, it is also effective to subject the epoxy resin composition to a preliminary reaction to increase the viscosity. As the viscosity increases, appropriate adhesiveness can be imparted to the prepreg, and it becomes possible to improve the handleability or preservation stability of the prepreg.

The thermoplastic resin [D] included in the present invention is insoluble in the epoxy resin [B] and is disposed at a surface of the prepreg. In a laminate of prepregs obtained by stacking a plurality of the prepregs and a cured product of the laminate, the thermoplastic resin [D] is localized to a space between fiber layers. In general, when an impact load is applied to a fiber reinforced composite material from an out-of-plane direction, delamination develops between the layers of the fiber reinforced composite material. In contrast, a fiber reinforced composite material containing a thermoplastic resin between layers can realize excellent impact resistance because a tough thermoplastic resin is shifted to a space between the layers. The form of the thermoplastic resin may be any form as long as the thermoplastic resin can be arranged in a layer form, and may be any form such as particles, mats of short fibers, nonwoven fabrics, or films.

The thermoplastic resin [D] used in the present invention may or may not have crystallinity. Specific examples of the thermoplastic resin include polyamides, polycarbonates, polyacetals, polyphenyleneoxides, polyphenylenesulfides, polyarylates, polyesters, polyamideimides, polyimides, polyetherimides, polyimides having a phenyltrimethylindan structure, polysulfones, polyethersulfones, polyetherketones, polyetheretherketones, polyaramides, polyethernitriles, and polybenzimidazoles. Among them, polyamides are most preferable since they greatly improve impact resistance due to their excellent toughness. Among the polyamides, polyamide 12, polyamide 6, polyamide 11, a polyamide 6/12 copolymer, and polyamide fine particles formed to have a semi IPN structure (interpenetrating polymer network structure) (semi IPN polyamides) with the epoxy compound described in Example 1 of Japanese Patent Laid-open Publication No. 01-104624 have particularly good adhesive strength with the epoxy resin. Therefore, these polyamides are preferable because they can improve the delamination strength of the fiber reinforced composite material at the time of drop impact to improve the impact resistance.

In the case where particles are used as the thermoplastic resin [D], the particles may have any of spherical, non-spherical, porous, whisker-like, and flaky shapes. However, it is most preferable to use spherical particles in order to ensure the impregnating property of the epoxy resin into the reinforced fibers and to reduce the influence of stress concentration induced by the difference in stiffness between the thermoplastic resin and the matrix resin. In order to retain these particles between layers in the fiber reinforced composite material, it is preferable to increase the size of the particles to such an extent that the particles do not enter the gaps between adjacent reinforced fibers. Meanwhile, reducing the size of the particles can reduce the thickness of the resin layer between the layers, and increase the fiber volume fraction. As for the particle size for realizing the above-mentioned conditions, the average particle diameter is preferably in the range of 3 µm to 40 µm, more preferably in the range of 5 µm to 30 µm.

Meanwhile, in the case where fibers are used as the thermoplastic resin [D], the fibers may have either of short fiber and long fiber shapes. In the case of short fibers, a method of using fibers similarly to particles as described in Japanese Patent Laid-open Publication No. 02-069566, or a method of processing the fibers into a mat can be employed. In the case of long fibers, a method of arranging long fibers in parallel on a surface of a prepreg as described in Japanese Patent Laid-open Publication No. 04-292634, or a method of arranging fibers randomly as described in WO 94/016003 can be employed. It is also possible to process the fibers and use the fibers as a sheet-shaped base material such as the woven fabric as described in Japanese Patent Laid-open Publication No. 02-032843, or a nonwoven fabric material or a knitted fabric as described in WO 94/016003. Alternatively, it is also possible to employ a method of spinning short fiber chips, chopped strands, milled fibers, or short fibers into yarns, and then arranging the yarns in parallel or randomly to make a woven fabric or a knitted fabric.

Herein, the phrase "being insoluble in an epoxy resin" means that the thermoplastic resin [D] does not substantially dissolve in an epoxy resin containing the thermoplastic resin [D] dispersed therein when the epoxy resin is thermally cured. More specifically, the phrase means that in an observation using, for example, a transmission electron microscope, the thermoplastic resin [D] is not substantially reduced in size from the original size in the cured epoxy resin, and can be observed with a clear interface with the matrix resin.

The prepreg of the present invention is characterized in that the thermoplastic resin [D] insoluble in the epoxy resin [B] is localized at a surface on one side of the prepreg.

The resin mass content in the prepreg of the present invention is preferably in the range of 25 to 45%. Herein, the resin mass content refers to the mass percentage of resin components excluding the reinforced fibers [A] (the sum of the epoxy resin [B], the hardener [C], the thermoplastic resin [D], and other additives) in the prepreg. When the resin mass content is 25% or more, sufficient flow of the matrix resin in the prepreg is easily achieved, the un-impregnated regions of the reinforced fiber layer are easily filled with the matrix resin during curing of the prepreg, and voids are less likely to be generated in the obtained fiber reinforced composite material. When the resin mass content is 45% or less, advantages of the fiber reinforced composite material that it is excellent in specific strength and specific elastic modulus can be easily obtained. In view of these, a more preferable range of the resin mass content is 30 to 36%.

The prepreg of the present invention contains the epoxy resin composition partially impregnated into the reinforced fibers. Herein, the phrase "partially impregnated" means a state in which the prepreg includes, in the reinforced fiber layer, a region that is not impregnated with a resin (un-impregnated region).

In the present invention, the prepreg has a degree of impregnation $\varphi$ with the epoxy resin composition of 30 to 95%, preferably 50 to 95%, more preferably 60 to 90%. When a prepreg is cut or prepregs are laminated, the prepreg may be cracked starting from an un-impregnated region. However, a high degree of impregnation $\varphi$ with the epoxy resin composition in the prepreg can reduce the frequency of cracks. Specifically, a degree of impregnation of 30% or more, preferably 50% or more, more preferably 60% or more provides a prepreg excellent in handleability. On the other hand, a low degree of impregnation $\varphi$ with the epoxy resin composition in the prepreg can easily ensure the continuity of the un-impregnated regions for removing volatiles, so that the volatiles can be efficiently removed. As a result, it is possible to suppress the generation of voids in the fiber reinforced composite material. In particular, setting the degree of impregnation to 95% or less, preferably 90% or less can provide a prepreg that is less likely to generate voids. Herein, the degree of impregnation $\varphi$ with the epoxy resin composition in the prepreg is calculated as (number of reinforced fibers, to which the epoxy resin composition is not attached, present per unit width)/(total number of reinforced fibers present per unit width). As a method of counting the number of reinforced fibers, the prepreg is cut with a cutter, and the resulting fracture surface is observed with a SEM. At this time, the prepreg is cut in a direction such that the prepreg is cut at a surface in which the number of reinforced fibers included in the cut surface is the largest. For example, in the case of a prepreg in which reinforced fibers are arranged unidirectionally, the prepreg is cut at a surface orthogonal to the fibers. Alternatively, when it is difficult to identify the surface in which the number of reinforced fibers included in the cut surface is large as in the case of a short fiber base material, four cross sections of the prepreg at an interval of 45 degrees (0-degree direction, 45-degree direction, 90-degree direction, and 135-degree direction) are observed, and the cross section in which the number of carbon fibers included in the cut surface is the largest is adopted. At this time, the observation magnification of the SEM is set to 500×, images each having a width of 1 mm, of which imaging regions do not overlap each other, are acquired, the degrees of impregnation φ of the prepreg are measured for the images, and the average of the degrees of impregnation φ is calculated.

The prepreg of the present invention is characterized in that the thermoplastic resin [D] insoluble in the epoxy resin [B] is localized at a surface on one side of the prepreg, and that in a layer of the reinforced fibers [A], a region un-impregnated with the epoxy resin composition shifts to the side where the thermoplastic resin [D] is localized.

Figure 1:
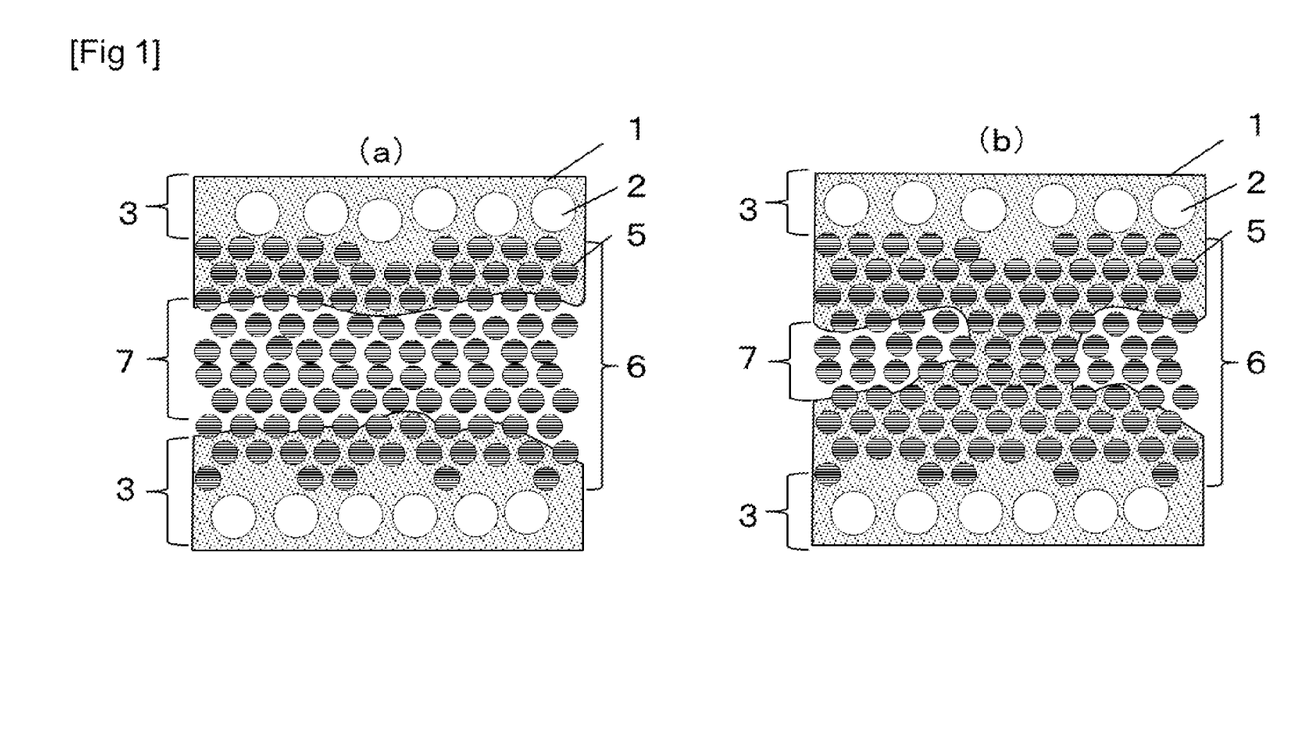
FIGS. 1(a) and 1(b) are schematic cross-sectional views showing a conventional prepreg for vacuum molding.
Figure 2:
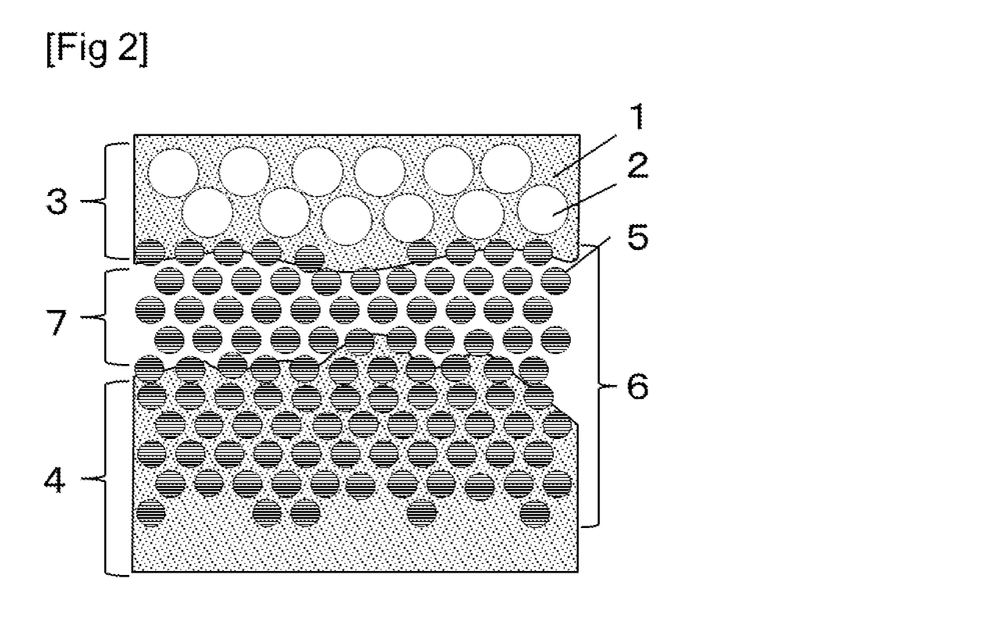
FIG. 2 is a schematic cross-sectional view showing a prepreg of the present invention for vacuum molding.

In order to describe the present invention more specifically, schematic views of a cross section of a conventional prepreg for vacuum molding are shown in FIGS. 1(a) and 1(b), and a schematic view of a cross section of the prepreg of the present invention is shown in FIG. 2. The following description is made with reference to these drawings.

In the conventional prepreg for vacuum molding, as shown in FIG. 1(a), an inter-layer 3 containing an epoxy resin composition 1 and a thermoplastic resin 2 insoluble in an epoxy resin is disposed at each surface of the prepreg. At the center of a reinforced fiber layer 6 including reinforced fibers 5 arranged in a layer form, an aggregate of reinforced fibers to which the epoxy resin composition is not attached, that is, an un-impregnated layer 7 is present. The un-impregnated layer 7 serves as an air flow path for removing volatiles and trapped air, whereby a fiber reinforced composite material with few voids can be obtained. However, when the degree of impregnation φ is increased in the conventional prepreg, depending on, for example, the density of the reinforced fibers or unevenness in wettability between the reinforced fibers and the resin, the resin impregnation distance (the distance from the surface of the reinforced fiber layer to an end of a resin-impregnated portion) may vary from site to site. Herein, in the case where the prepreg is impregnated with the epoxy resin composition from both the surfaces thereof, if any sites where the resin impregnation distance is long stochastically overlap each other, the epoxy resin composition in the inter-layers at both surfaces joins together to lose the continuity of the un-impregnated layer 7 as shown in FIG. 1(b). Therefore, this function of the un-impregnated layer as an air flow path for removal of volatiles is diminished, hence is a cause of void growth.

In contrast, in the prepreg of the present invention, as shown in FIG. 2, a thermoplastic resin 2 insoluble in an epoxy resin is localized at a surface on one side of the prepreg. In the present invention, the term "localized" refers to a state in which substantially all the thermoplastic resin 2 insoluble in the epoxy resin is present on one side of the prepreg. Specifically, the term refers to a state in which when the region of the thermoplastic resin 2 is extracted from a cross-sectional image of the prepreg, 90% or more of the total area of the region is present on one side of the prepreg.

A technique for obtaining the cross-sectional image of the prepreg is as follows. First, the prepreg is heated to 180° C. at a very low temperature ramp rate (2° C./min) to cure the resin, and then the cured prepreg is embedded in a resin and polished to obtain a cross section of the cured prepreg. A region corresponding to a width of 0.2 mm in the cross section of the cured prepreg is observed with an optical microscope at a magnification of 1000×.

Furthermore, in the prepreg of the present invention, impregnation of the resin into the reinforced fiber layer is suppressed by the inter-layer 3 containing the thermoplastic resin 2 insoluble in the epoxy resin to make the end of the resin-impregnated portion smooth. Therefore, the resin surface of the resin-impregnated portion of the inter-formative layer 3 containing the thermoplastic resin 2 is relatively smooth, and even if the impregnation distance of an epoxy resin layer 4 in which the thermoplastic resin 2 is not disposed is varied from site to site, it is possible to ensure the continuity of the un-impregnated layer for removing the volatiles.

There are a plurality of methods as means for suppressing resin impregnation into the reinforced fiber layer by the inter-layer 3 containing the thermoplastic resin 2 insoluble in the epoxy resin. In the first place, when the inter-layer contains a thermoplastic resin as in the present invention, the inter-layer has high viscosity, and the resin impregnation into the reinforced fiber layer is suppressed. In order to further suppress resin impregnation into the reinforced fiber layer, it is also effective to set the viscosity of the epoxy resin composition contained in the inter-layer higher than the viscosity of the epoxy resin composition contained in the epoxy resin layer 4 that does not contain the thermoplastic resin 2.

As described above, the prepreg of the present invention is characterized in that the impregnation distance on the side where the inter-layer contains the thermoplastic resin 2 insoluble in the epoxy resin is short, while the impregnation distance on the side where the epoxy resin layer does not contain the thermoplastic resin 2 insoluble in the epoxy resin is long. As a result, the prepreg may have high degree of impregnation while ensuring an air flow path for continuous removal of volatiles. More specifically, the prepreg of the present invention is characterized in that an un-impregnated layer 7 shifts not to the center of a reinforced fiber layer 6 but to the side where the thermoplastic resin 2 insoluble in the epoxy resin is disposed.

Figure 3:
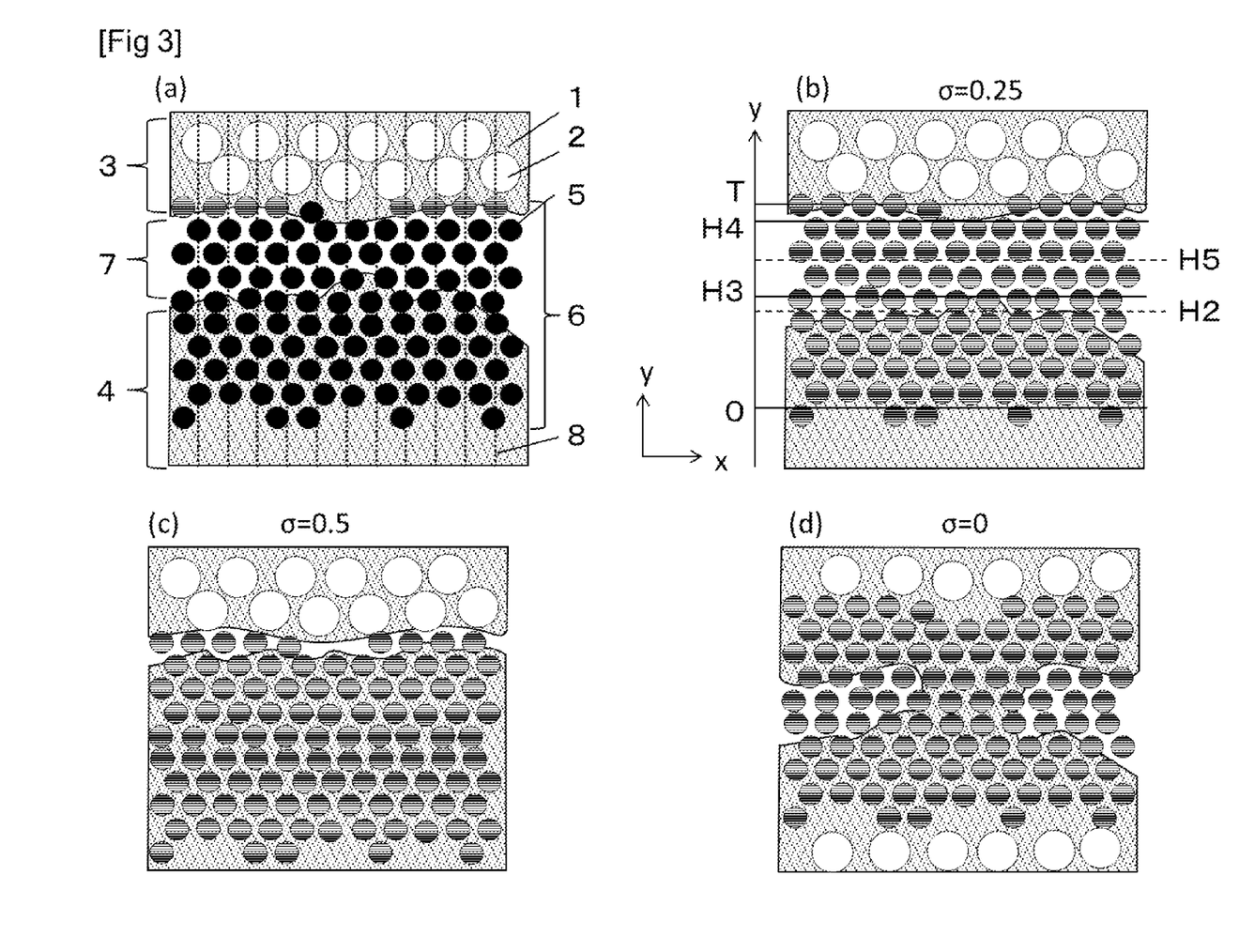
FIGS. 3(a) to 3(d) are schematic cross-sectional views of a prepreg showing a method for calculating a shift parameter σ.

Herein, in order to quantitatively express the fact that the un-impregnated layer shifts to the side where the thermoplastic resin 2 insoluble in the epoxy resin is disposed, the shift parameter σ is defined by the following procedure. Herein, a method of calculating the shift parameter σ is described with reference to the schematic views of a cross section of the prepreg in FIGS. 3(a) and 3(b). Note that, for the sake of simplicity, in FIG. 3, the side where the thermoplastic resin is localized is defined as an upper side, and the side where the prepreg does not contain the thermoplastic resin is defined as a lower side.

First, as shown in FIG. 3(a), a region corresponding to a width of 1 mm is extracted from a cross-sectional image of the prepreg, and ten lines that are perpendicular to a reinforced fiber sheet and that divide the region into eleven equal portions in the width direction (equally dividing lines 8) are drawn. Then, a y-coordinate of an end of the reinforced fiber layer 6 on the epoxy resin layer 4 side (the side where the prepreg does not contain the thermoplastic resin 2) at one of the equally dividing lines is calculated, and the y-coordinate is defined as an end y-coordinate of the lower side of the reinforced fiber layer. The end y-coordinates of the lower side are calculated for the remaining ten equally dividing lines 8 according to the same procedure, and the average of the calculated end y-coordinates is defined as 0 of the y-coordinate axis. Then, the average of end y-coordinates of the upper side is calculated according to the same procedure, and the y-coordinate is defined as T. T corresponds to the thickness of the reinforced fiber layer 6. A central y-coordinate H2 of the entire reinforced fiber layer present in the image is defined by H2=T/2. Further, y-coordinates of ends at the lower side of the reinforced fibers in the un-impregnated layer at the equally dividing lines 8 are obtained, and the average of the y-coordinates is defined as H3. Similarly, y-coordinates of ends at the upper side of the reinforced fibers in the un-impregnated layer at the equally dividing lines 8 are obtained, and the average of the y-coordinates is defined as H4. Note, however, that in the calculation of H3 and H4, when there is no un-impregnated fiber on any of the equally dividing lines 8, the equally dividing line 8 is excluded from the calculation of the average value. More specifically, when there is one equally dividing line 8 on which no un-impregnated fiber can be observed, H4 is calculated from the average of the coordinates of the remaining nine un-impregnated fibers.

At this time, a central coordinate H5 of the un-impregnated fibers is defined by H5=(H4+H3)/2. Using this value, the shift parameter σ is defined by $$\sigma = (H5-H2)/T.$$

As for the parameter, in the case where the epoxy resin composition is substantially completely impregnated into the reinforced fibers as shown in FIG. 3(c) in which H3, which is the average of y-coordinates of the un-impregnated reinforced fibers located at the end on the epoxy resin layer 4 side at the equally dividing lines 8, coincides with H4, which is the average of y-coordinates of the un-impregnated reinforced fibers located at the end on the inter-formative layer 3 side at the equally dividing lines 8, H5=0.5, H2=0, and σ is 0.5. Further, when the central coordinate of the reinforced fiber layer coincides with the central coordinate of the un-impregnated layer as shown in FIG. 3(d), H2=T/2, H5=T/2, and σ is 0. In the present invention, the case where σ is within the range of 0.05<σ<0.50 is defined that the un-impregnated regions "shift to the side where the prepreg contains the thermoplastic resin 2". In the prepreg of the present invention, the shift parameter σ is 0.10<σ<0.45, preferably in the range of 0.20<σ<0.45. When the shift parameter is within the above-mentioned range, the continuity of un-impregnated regions in the in-plane direction inside the laminate of prepregs can be easily ensured, and the volatiles can be efficiently removed. If σ is too high or too low, it is difficult to ensure the continuity of un-impregnated regions for the removal of volatiles and to efficiently remove the volatiles, and a large number of voids may be generated in the fiber reinforced composite material.

In the prepreg of the present invention, it is preferable that the amount of reinforced fibers per unit area be 30 to 600 g/m². An amount of reinforced fibers of 30 g/m² or more eliminates the necessity of laminating a large number of sheets in order to form the prepreg into a fiber reinforced composite material having a predetermined thickness, so that the workload is easily reduced. Further, an amount of reinforced fibers of 600 g/m² or less easily improves the drapability of the prepreg. Moreover, when producing a prepreg, or when thermally curing the prepreg, the epoxy resin composition may be easily impregnated into the unfilled regions in the reinforced fiber layer, and voids may be less likely to be generated. Furthermore, in order to achieve a continuous air permeability path while exhibiting a high degree of impregnation σ, it is better to have a smaller basis weight for shortening the resin impregnation distance. However, the amount of reinforced fibers per unit area is more preferably in the range of 100 to 300 g/m² since a thin fiber reinforced composite material is susceptible to the influence of the density of fibers.

Further, in the prepreg of the present invention, the volatiles in the prepreg can be more efficiently removed by ensuring the continuity from a vacuum source to the un-impregnated regions in the prepreg. For that purpose, it is preferable that the continuity of the un-impregnated regions in the prepreg be ensured, and the prepreg have air permeability. Herein, the simplest method for ensuring the continuity of the un-impregnated regions is to reduce the degree of impregnation φ to increase the un-impregnated regions. However, it is preferable to maintain a high degree of impregnation φ in order to eliminate the unfilled regions by resin flow after the removal of volatiles and to suppress voids in the fiber reinforced composite material, or to suppress cracks of prepregs in the out-of-plane direction during lamination of the prepregs. In order to realize these matters, in the prepreg of the present invention, the in-plane air permeability coefficient K is preferably 2.0×(1−φ/100)×10$^{−14}$ [m²] or more (φ=degree of impregnation (%)), more preferably 2.3×(1−φ/100)×10$^{−14}$ [m²] or more. Herein, the in-plane air permeability coefficient K in the present invention is measured by a permeability measurement method schematically shown in FIG. 4. The details of the measurement method are described below. First, in a laminate 9 of prepregs in which ten layers of strip-like prepregs (fiber orientation direction: 100 mm, direction perpendicular to fibers: 50 mm) are laminated, permeability of the prepreg in the thickness direction and at the side surfaces is blocked by a sealant 10 with only both ends of the prepreg in the fiber orientation direction being opened. The laminate 9 of prepregs and the sealant 10 are sealed with a cover film 11 and a metal plate 12. An air flow path is ensured along a glass tape 13 at the ends of the laminate 9 of prepregs. The laminate is opened to the atmospheric pressure at a permeability opening 15 (the pressure of a pressure gauge 16 on the permeability opening 15 side is defined as Pa (unit: Pa)), and the side of the laminate opposite to the permeability opening 15 is placed in a vacuum environment (the pressure of a pressure gauge 16 on the vacuum pump 17 side is defined as Pv (unit: Pa)) using a vacuum pump 17. In this case, a pressure difference is generated between both the sides of the prepregs. The permeability coefficient K (unit: m²) of the prepregs in the in-plane direction is defined by the following expression (1).

Figure 4:
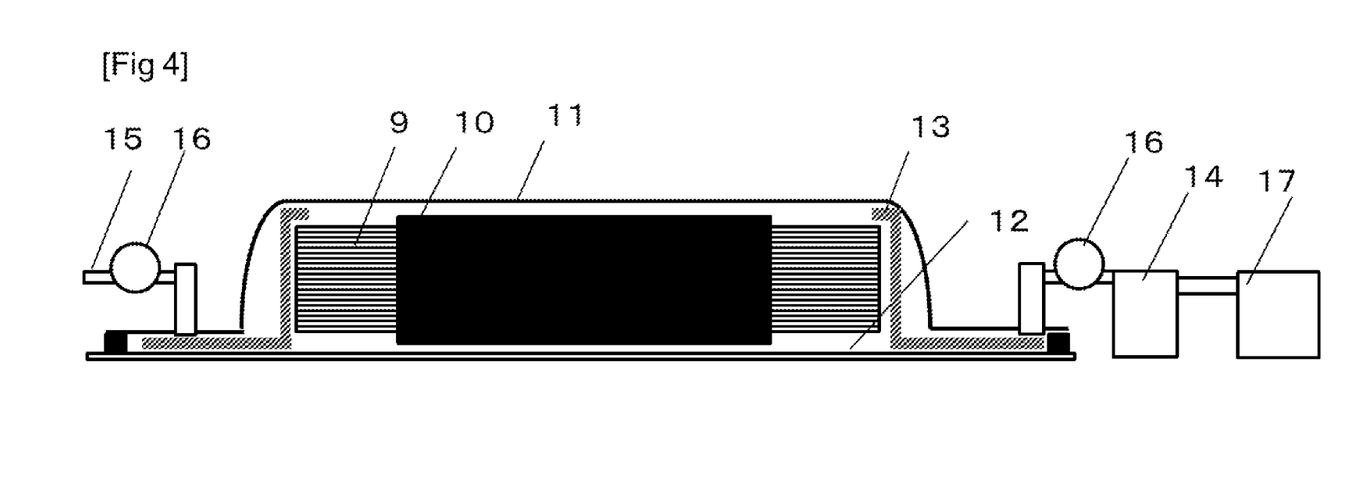
FIG. 4 is a schematic view showing a configuration for measuring an in-plane air permeability coefficient K of a prepreg.

[Math. 1]

$$K = \frac{2\mu L Q_a}{A_P}\left(\frac{P_a}{P_a^2 - P_v^2}\right) \qquad \text{Expression (1)}$$

In the expression, μ is the viscosity of the air (unit: Pa·s), L is the length of the prepreg (unit: m), Ap is the cross-sectional area of the prepreg (unit: m²), and Qa is the air flow rate (unit: m³/s) measured by an air flow meter 14.

The orientation direction in the present invention means a cross section of the prepreg in the Θ direction, where Θ is the average of orientation angles θ of the fibers obtained by observing the surface of the prepreg with an optical microscope. In the calculation of the average value Θ, 30 fibers are arbitrarily selected from fibers observed with an optical microscope, and the average of the orientation angles of the fibers is used.

There are a plurality of methods as a method for producing the prepreg of the present invention.

The simplest method for producing the prepreg of the present invention is a hot-melt process in which an epoxy resin film is stacked on a surface of a reinforced fiber sheet in which fibers are arranged in a sheet form, and the epoxy resin is impregnated into the reinforced fiber sheet under pressure/heating. The prepreg of the present invention can be obtained, for example, by sandwiching surfaces of a reinforced fiber sheet in which fibers are arranged in a sheet form with an epoxy resin film containing a thermoplastic resin from one side of the sheet and an epoxy resin film containing only an epoxy resin composition from the other side of the sheet, and passing the resulting laminate between compression rollers. In addition, in order to further improve the continuity of un-impregnated regions in this production method, it is important to suppress the impregnation of the epoxy resin composition into the reinforced fiber layer on the side where the thermoplastic resin is disposed. As a means for realizing this suppression, it is also effective to set the viscosity of the epoxy resin film in which the thermoplastic resin is disposed higher than the viscosity of the epoxy resin film containing only the epoxy resin composition. As another means, it is also effective to divide the impregnation process into two stages, and first impregnate the reinforced fiber sheet with the epoxy resin film containing only the epoxy resin composition at high temperature, and then impregnate the reinforced fiber sheet with the epoxy resin film containing the thermoplastic resin at low temperature. Furthermore, it is also effective to combine these procedures.

Another method for producing the prepreg is a method of disposing, on surfaces of a reinforced fiber sheet in which fibers are arranged in a sheet form, an epoxy resin film containing only an epoxy resin composition on one side of the sheet and an epoxy resin film containing only an epoxy resin composition on the other side of the sheet, and further disposing a film of an epoxy resin composition containing a thermoplastic resin on the surface of the latter epoxy resin film. Taking such means makes it easier to ensure the continuity of un-impregnated regions than in the above-mentioned method for producing the prepreg, and it is possible to further reduce the possibility of void growth.

The fiber reinforced composite material of the present invention is a cured product of the prepreg of the present invention. More specifically, the fiber reinforced composite material of the present invention can be produced by thermally curing the prepreg of the present invention or a laminate of the prepregs. The prepreg of the present invention is suitable for vacuum bag only molding, but can also be used as a prepreg that is less likely to generate voids also in autoclave cure and press molding.

When the prepreg of the present invention thermally cured in an oven, for example, it is possible to obtain a fiber reinforced composite material with few voids using the following molding method. A single-layer prepreg or a laminate of prepregs obtained by laminating a plurality of prepregs is wrapped in a bag having an internal pressure of 11 kPa or less and maintained at a temperature of 20 to 70° C., and volatiles are removed. The prepreg or the laminate of prepregs is heated to the curing temperature while the absolute pressure is maintained at 11 kPa or less. Herein, the volatiles are removed preferably under the conditions of a pressure of 0.1 kPa to 11 kPa, more preferably under the conditions of 0.1 kPa to 7 kPa. The higher the degree of vacuum is, that is, the lower the internal pressure is, the shorter the time taken to remove the volatiles. Setting the internal pressure to 11 kPa or less makes sufficient removal of volatiles in the prepreg easier, and voids are less likely to be generated in the obtained fiber reinforced composite material.

In addition, the un-impregnated regions have to be filled with the resin at the time of molding, and it is effective to reduce the viscosity of the resin for this purpose. For example, it is preferable to hold the prepreg in a heated state but at a temperature lower than the curing start temperature of the resin (40° C. to 130° C.) for a long time to fill the un-impregnated regions with the resin, and then heat the prepreg to the curing temperature of the resin (130° C. to 200° C.) to cure the resin.

EXAMPLES

Hereinafter, the present invention is described in detail by way of examples. However, the scope of the present invention is not limited to these examples. It is to be noted that the unit "part" in composition ratios means part by mass unless otherwise noted. Moreover, the characteristics were measured in an environment of a temperature of 23° C. and a relative humidity of 50% unless otherwise noted.

<Materials Used in Examples of the Present Invention and Comparative Examples>

(1) Component [A]: Reinforced Fibers

[Carbon Fibers]

Carbon fibers (trade name: "TORAYCA (registered trademark)" T800S-24K-10E, number of filaments: 24,000, tensile strength: 5.9 GPa, tensile modulus: 290 GPa, tensile elongation: 2.0%, manufactured by Toray Industries, Inc.)

(2) Component [B]: Epoxy Resin

[Epoxy Resin]

Bisphenol A epoxy resin (trade name: "jER (registered trademark)" 825, manufactured by Mitsubishi Chemical Corporation)

Tetraglycidyl diaminodiphenylmethane (trade name: "Araldite (registered trademark)" MY721, manufactured by Huntsman Advanced Materials LLC)

Bisphenol F epoxy resin (trade name: "EPICLON (registered trademark)" 830, manufactured by DIC Corporation)

(3) Component [C]: Hardener

[Aromatic Amine Hardener]

4,4'-Diaminodiphenyl sulfone (trade name: "SEIKACURE S", manufactured by Wakayama Seika Kogyo Co., Ltd.)

(4) Component [D]: Thermoplastic Resin Insoluble in Epoxy Resin [B]

[Thermoplastic Resin]

Polyamide fine particles obtained by the following production method (average particle diameter: 13 μm)

To a mixed solvent of 300 parts of chloroform and 100 parts of methanol, 90 parts of a transparent polyamide ("Grilamid (registered trademark)" TR55, manufactured by EMS-CHEMIE (Japan) Ltd.), 7.5 parts of an epoxy resin ("jER (registered trademark)" 828, manufactured by Mitsubishi Chemical Corporation), and 2.5 parts of a hardener ("TOHMIDE (registered trademark)" #296, manufactured by T&K TOKA CO., LTD.) were added to produce a homogeneous solution. Then, using a spray gun for coating, the obtained homogeneous solution was sprayed in the form of mist toward the liquid surface of 3000 parts of n-hexane being stirred to precipitate the solute. The precipitated solid was separated by filtration and thoroughly washed with n-hexane, followed by vacuum drying at a temperature of 100° C. for 24 hours to produce spherical epoxy-modified polyamide particles having a semi IPN structure.

(5) Component other than components (1) to (4): Thermoplastic resin soluble in epoxy resin [B]

Polyethersulfone (trade name: "Sumika Excel (registered trademark)" PES5003P, manufactured by SUMITOMO CHEMICAL COMPANY, LIMITED)

<Evaluation Methods>

The measurements were performed on the epoxy resin composition and the prepreg of each of the examples according to the following measurement methods.

(1) Measurement of Degree of Impregnation φ with Epoxy Resin Composition in Prepreg A prepreg was cut with a knife, and the resulting fracture surface was observed with a SEM ("VHX (registered trademark)" 5000 manufactured by KEYENCE CORPORATION). The degree of impregnation was calculated according to the above-mentioned technique by the expression: degree of impregnation φ=(number of carbon fibers to which the epoxy resin composition is not attached)/(total number of carbon fibers present per unit width).

(2) Measurement of Shift Parameter σ

A prepreg was cut with a cutter, and the resulting fracture surface was observed with a SEM ("VHX (registered trademark)" 5000 manufactured by KEYENCE CORPORATION). The coordinate of the central point of each carbon fiber was obtained, and the shift parameter σ was calculated according to the above-mentioned technique.

(3) In-Plane Air Permeability Coefficient (K)

Eight layers of strip-like prepregs (fiber orientation direction: 100 mm, direction perpendicular to fibers: 50 mm) were laminated according to the above-mentioned technique. The amount of air flowing in the fiber direction of the laminate of prepregs, and pressures Pa and Pv at both ends of the prepregs were measured. The in-plane air permeability coefficient K is evaluated according to Expression 1.

(4) Handleability of Prepreg

Prepregs were prepared by cutting the sheet with a cutter in an environment of 23° C., and the prepregs were observed about fluffs generated at the ends of the prepregs, delamination of the prepregs in the out-of-plane direction during lamination, and ease of correction during lamination. The relative merits of the prepregs were judged based on the following criteria.

A: acceptable

B: the prepregs can be laminated, but fluffs are partially generated from the ends C: the prepregs can be laminated, but fluffs are generated from the ends, and correction of the lamination takes ingenuity D: fail (5) Measurement of Void Fraction of Fiber Reinforced Composite Material Sixteen prepregs each 300 mm long and 150 mm wide were unidirectionally laminated to form a laminate of prepregs, and a 100 μm-thick PTFE film was disposed on either surface of the laminate of prepregs. The resulting laminate was placed on a 10 mm-thick aluminum plate and covered with a nylon film. Furthermore, in an environment of 25° C., the degree of vacuum around the laminate of prepregs was set to 3 kPa, and the laminate of prepregs was left for 3 hours to remove volatiles. Then, while the degree of vacuum was maintained at an absolute pressure of 3 kPa, the laminate of prepregs was heated to a temperature of 120° C. at a rate of 1.5° C./min and held for 180 minutes, and further heated to a temperature of 180° C. at a rate of 1.5° C./min and held for 120 minutes to cure the resin, whereby a fiber reinforced composite material was obtained. From the fiber reinforced composite material, three sample pieces each 10 mm long and 10 mm wide were cut out, and cross sections of the sample pieces were polished. Then, the sample pieces were observed with an optical microscope using a 50×lens so that the upper and lower surfaces of the fiber reinforced composite material were within the field of view to acquire images. The void fraction for each image was calculated by calculating the ratio between the void region and the total cross-sectional area in the acquired images. The same operation was carried out at three sites for each sample, for a total of nine sites, and the average of the nine void fractions was taken as the void fraction at each evaluation level.

(6) Measurement of Compression After Impact (CAI) of Fiber Reinforced Composite Material Twenty four unidirectional prepregs were laminated while shifting the prepregs by 45 degrees to form a laminate of prepregs having a lamination structure of [+45°/0°/−45°/90°]$_{3s}$, and a 100 μm-thick PTFE film was disposed on either surface of the laminate of prepregs. The resulting laminate was placed on a 10 mm-thick aluminum plate and covered with a nylon film. Furthermore, in an environment of 25° C., the degree of vacuum around the laminate of prepregs was set to 3 kPa, and the laminate of prepregs was left for 3 hours to remove volatiles. Then, the laminate of prepregs was heated to a temperature of 120° C. at a rate of 1.5° C./min and held for 180 minutes while the degree of vacuum was maintained at 3 kPa, and then heated to a temperature of 180° C. at a rate of 1.5° C./min and held for 120 minutes to cure the prepregs, whereby a fiber reinforced composite material was produced. From the fiber reinforced composite material, a sample of 150 mm long and 100 mm wide was cut out, a drop impact of 6.7 J/mm was applied to the center of the sample in accordance with SACMA SRM 2R-94, and the compression after impact was determined.

Example 1

To the kneader, 60 parts by mass of "Araldite (registered trademark)" MY721 and 40 parts by mass of "jER (registered trademark)" 825 were added, and 12 parts by mass of "Sumika Excel (registered trademark)" PES5003P was further added and mixed, and the contents were thermally dissolved. Then, 46 parts by mass of "SEIKACURE S" as a hardener was kneaded to produce an epoxy resin composition (for a first film) containing no insoluble thermoplastic resin in the epoxy resin. Similarly, 60 parts by mass of "Araldite (registered trademark)" MY721 and 40 parts by mass of "jER (registered trademark)" 825 were added to the kneader, and 12 parts by mass of "Sumika Excel (registered trademark)" PES5003P was further added, and the contents were thermally dissolved. Then, 45 parts by mass of polyamide fine particles as thermoplastic resin particles was kneaded. Then, 46 parts by mass of "SEIKACURE S" as a hardener was kneaded to produce an epoxy resin composition (for a second film) containing a thermoplastic resin insoluble in an epoxy resin.

Each of the produced two epoxy resin compositions were applied to release paper using a knife coater to produce two resin films of 52 g/m². Herein, a resin film containing no thermoplastic resin particles is referred to as the first film, and a resin film containing a thermoplastic resin is referred to as the second film. Then, carbon fibers were arranged unidirectionally so that the fiber amount would be 190 g/m² to form a carbon fiber sheet, then the first film was applied to one surface of the carbon fiber sheet, and the resin was impregnated into the carbon fiber sheet with a roller having a surface temperature of 100° C. being pressed against the resulting in a continuous laminate sheet. Then, the second film containing the polyamide fine particles was applied to the back surface of the carbon fiber sheet, and the resin was impregnated into the carbon fiber sheet with a roller having a surface temperature of 100° C. being pressed against the laminate. Thus, a unidirectional prepreg having a resin mass fraction of 35% was produced.

Examples 2 to 5

Verification of Influence of Resin Impregnation Temperature

A prepreg was produced by the same method as in Example 1 except that the surface temperature of the roller during the transfer of the first film was 110° C. in Example 2, 120° C. in Example 3, 130° C. in Example 4, and 140° C. in Example 5, and a fiber reinforced composite material was obtained.

Examples 6 and 7

Influence of Viscosity of Epoxy Resin

A prepreg was produced by the same method as in Example 1 except that the content of "Sumika Excel (registered trademark)" PES5003P in the epoxy resin composition for the first film was changed to 20 parts in Example 6 and 30 parts in Example 7, and a fiber reinforced composite material was obtained.

Example 8

A prepreg was produced by the same method as in Example 1 except that half of "jER (registered trademark)" 825 in the epoxy resin composition for the first film and the epoxy resin composition for the second film was replaced with "EPICLON (registered trademark)" 830, the amount of "Sumika Excel (registered trademark)" PES5003P in the second film was changed to 18 parts by mass, and the surface temperature of the roller during the transfer of the first film was changed to 130° C., and a fiber reinforced composite material was obtained.

Example 9

A prepreg was produced by the same method as in Example 1 except that half of "jER (registered trademark)" 825 in the epoxy resin composition for the first film and the epoxy resin composition for the second film was replaced with "EPICLON (registered trademark)" 830, the amount of "Sumika Excel (registered trademark)" PES5003P in the second film was changed to 15 parts by mass, and the surface temperature of the roller during the transfer of the first film was changed to 140° C., and a fiber reinforced composite material was obtained.

Comparative Examples 1 and 2

A prepreg was produced by the same method as in Example 1 except that 23 parts of polyamide fine particles were added to both the epoxy resin for the first film and the epoxy resin for the second film, and the surface temperature of the roller was changed to 140° C. in Comparative Example 1 and 120° C. in Comparative Example 2, and a fiber reinforced composite material was obtained.

Comparative Example 3

A prepreg was produced by the same method as in Example 1 except that half of "jER (registered trademark)" 825 in the epoxy resin composition for the first film and the epoxy resin composition for the second film was replaced with "EPICLON (registered trademark)" 830, the amount of "Sumika Excel (registered trademark)" PES5003P in the second film was changed to 18 parts by mass, and the surface temperature of the roller during the transfer of the first film and the second film was changed to 70° C., and a fiber reinforced composite material was obtained.

Comparative Example 4

A prepreg was produced by the same method as in Example 1 except that the content of "Sumika Excel (registered trademark)" PES5003P in the epoxy resin composition for the first film and the epoxy resin composition for the second film was changed to 8 parts by mass, the surface temperature of the roller during the transfer of the first film was changed to 130° C., and the surface temperature of the roller during the transfer of the second film was changed to 120° C., and a fiber reinforced composite material was obtained.

Comparative Example 5

A prepreg was produced by the same method as in Example 1 except that the content of "Sumika Excel (registered trademark)" PES5003P in the epoxy resin composition for the first film and the epoxy resin composition for the second film was changed to 6 parts by mass, the surface temperature of the roller during the transfer of the first film was changed to 140° C., and the surface temperature of the roller during the transfer of the second film was changed to 100° C., and a fiber reinforced composite material was obtained.

Examples 1 to 5 and Comparative Examples 1 and 2

As shown in Tables 1 and 3, among prepregs having comparable degrees of impregnation φ, in prepregs in which the particle layer was disposed on one side thereof, and the positions of the centers of gravity of the un-impregnated regions were shifted to the side of the particles, the prepregs had high air permeability, and the fiber reinforced composite materials had a void fraction of 1% or less and achieves a high CAI value. It seems that the improvement in the removal efficiency of volatiles in the un-impregnated area led to a decrease in the amount of voids and an increase in the CAI value.

Examples 6 and 7 and Comparative Example 3

As shown in Tables 2 and 3, in Examples 6 and 7, the blending amount of the thermoplastic resin component was increased as compared with Examples 1 to 5. As a result, although the handleability of the prepreg was slightly deteriorated due to the resin thickening and the decrease in the degree of impregnation φ, the prepregs had high air permeability, and the fiber reinforced composite materials had a void fraction of 1% or less and a high CAI value due to the degree of impregnation φ in the range of 30% to 95%. In Comparative Example 3, fabrication of the laminate of prepregs was difficult. This is probably due to the degree of impregnation was too low.

Examples 8 and 9 and Comparative Examples 4 and 5

As shown in Tables 2 and 3, in Examples 8 and 9, the degree of impregnation φ is increased in comparison with Example 1 due to the high roller temperature. It was revealed that the fiber reinforced composite materials of Examples 8 and 9 exhibit high void fraction and high CAI due to the degree of impregnation φ in the range of 30 to 95% and the in-plane air permeability coefficient K of the prepreg of $20((1-\varphi))/100)\times 4.0\times 10^{-12}$ m² or more, although the shift parameter σ was comparable to that of Comparative Example 4 in both of Examples 8 and 9. In Comparative Example 5, many voids were generated. It seems that the voids were caused by a high shift parameter σ to ensure the continuity of the un-impregnated regions.

TABLE 1

| | | | Example 1 | | Example 2 | | Example 3 | | Example 4 | | Example 5 | |
|---|---|---|---|---|---|---|---|---|---|---|---|---|
| | | | First film | Second film | First film | Second film | First film | Second film | First film | Second film | First film | Second film |
| Component [B] | Epoxy resin | Bisphenol A epoxy resin ("jER (registered trademark)" 825) | 40 | 40 | 40 | 40 | 40 | 40 | 40 | 40 | 40 | 40 |
| | | Bisphenol F epoxy resin ("EPICLON (registered trademark)" 830) | — | — | — | — | — | — | — | — | — | — |
| | | Tetraglycidyl diaminodiphenylmethane ("Araldite (registered trademark)" MY721) | 60 | 60 | 60 | 60 | 60 | 60 | 60 | 60 | 60 | 60 |
| Component [C] | Hardener | 4,4'-Diaminodiphenyl sulfone (SEIKACURE S) | 46 | 46 | 46 | 46 | 46 | 46 | 46 | 46 | 46 | 46 |
| Component [D] | Thermoplastic resin insoluble in epoxy resin [B] | Polyamide fine particles | — | 45 | — | 45 | — | 45 | — | 45 | — | 45 |
| Component other than components [A] to [D] | Thermoplastic resin | Polyethersulfone ("Sumika Excel (registered trademark)" PES5003P) | 12 | 12 | 12 | 12 | 12 | 12 | 12 | 12 | 12 | 12 |
| | Surface temperature of roller (° C.) | | 100 | 100 | 110 | 100 | 120 | 100 | 130 | 100 | 140 | 100 |
| Properties of prepreg | Degree of impregnation φ (%) of thermosetting resin composition in prepreg | | 61 | | 66 | | 72 | | 83 | | 93 | |
| | Shift parameter σ | | 0.28 | | 0.31 | | 0.32 | | 0.35 | | 0.43 | |
| | Penetration coefficient K in in-plane direction (m²) | | $2.2 \times 10^{-13}$ | | $8.9 \times 10^{-14}$ | | $7.7 \times 10^{-14}$ | | $6.2 \times 10^{-14}$ | | $1.5 \times 10^{-14}$ | |
| | Handleability | | A | | A | | A | | A | | A | |
| Properties of reinforced fiber composite material | Void fraction (%) | | 0.2 | | 0.2 | | 0.4 | | 0.5 | | 1.2 | |
| | CAI (Mpa) | | 273 | | 288 | | 284 | | 280 | | 261 | |

TABLE 2

| | | | Example 6 | | Example 7 | | Example 8 | | Example 9 | |
|---|---|---|---|---|---|---|---|---|---|---|
| | | | First film | Second film | First film | Second film | First film | Second film | First film | Second film |
| Component [B] | Epoxy resin | Bisphenol A epoxy resin ("jER (registered trademark)" 825) | 40 | 40 | 40 | 40 | 20 | 20 | 20 | 20 |
| | | Bisphenol F epoxy resin ("EPICLON (registered trademark)" 830) | — | — | — | — | 20 | 20 | 20 | 20 |
| | | Tetraglycidyl diaminodiphenylmethane ("Araldite (registered trademark)" MY721) | 60 | 60 | 60 | 60 | 60 | 60 | 60 | 60 |
| Component [C] | Hardener | 4,4'-Diaminodiphenyl sulfone (SEIKACURE S) | 46 | 46 | 46 | 46 | 46 | 46 | 46 | 46 |

TABLE 2-continued

|  |  |  | Example 6 | | Example 7 | | Example 8 | | Example 9 | |
| --- | --- | --- | --- | --- | --- | --- | --- | --- | --- | --- |
|  |  |  | First film | Second film | First film | Second film | First film | Second film | First film | Second film |
| Component [D] | Thermoplastic resin insoluble in epoxy resin [B] | Polyamide fine particles | — | 45 | — | 45 |  | 45 | — | 45 |
| Component other than components [A] to [D] | Thermoplastic resin | Polyethersulfone ("Sumika Excel (registered trademark)" PES5003P) | 20 | 12 | 30 | 12 | 12 | 18 | 12 | 15 |
|  | Surface temperature of roller (° C.) | | 100 | 100 | 100 | 100 | 130 | 100 | 140 | 100 |
| Properties of prepreg | Degree of impregnation φ (%) of thermosetting resin composition in prepreg | | 51 | | 35 | | 75 | | 91 | |
|  | Shift parameter σ | | 0.23 | | 0.15 | | 0.37 | | 0.44 | |
|  | Penetration coefficient K in in-plane direction (m$^2$) | | $1.3 \times 10^{-13}$ | | $1.7 \times 10^{-13}$ | | $5.5 \times 10^{-14}$ | | $4.2 \times 10^{-14}$ | |
|  | Handleability | | B | | C | | A | | A | |
| Properties of reinforced fiber composite material | Void fraction (%) | | 0.1 | | 0.1 | | 0.8 | | 0.5 | |
|  | CAI (Mpa) | | 283 | | 283 | | 292 | | 280 | |

TABLE 3

|  |  |  | Comparative Example 1 | | Comparative Example 2 | | Comparative Example 3 | | Comparative Example 4 | | Comparative Example 5 | |
| --- | --- | --- | --- | --- | --- | --- | --- | --- | --- | --- | --- | --- |
|  |  |  | First film | Second film | First film | Second film | First film | Second film | First film | Second film | First film | Second film |
| Component [B] | Epoxy resin | Bisphenol A epoxy resin ("jER (registered trademark)" 825) | 40 | 40 | 40 | 40 | 20 | 20 | 40 | 40 | 40 | 40 |
|  |  | Bisphenol F epoxy resin ("EPICLON (registered trademark)" 830) | — | — | — | — | 20 | 20 | — | — | — | — |
|  |  | Tetraglycidyl diaminodiphenylmethane ("Araldite (registered trademark)" MY721) | 60 | 60 | 60 | 60 | 60 | 60 | 60 | 60 | 60 | 60 |
| Component [C] | Hardener | 4,4'-Diaminodiphenyl sulfone (SEIKACURE S) | 46 | 46 | 46 | 46 | 46 | 46 | 46 | 46 | 46 | 46 |
| Component [D] | Thermoplastic resin insoluble in epoxy resin [B] | Polyamide fine particles | 23 | 23 | 23 | 23 |  | 45 | — | 45 | — | 45 |
| Component other than components [A] to [D] | Thermoplastic resin | Polyethersulfone ("Sumika Excel (registered trademark)" PES5003P) | 12 | 12 | 12 | 12 | 12 | 18 | 8 | 8 | 6 | 6 |
|  | Surface temperature of roller (° C.) | | 140 | 140 | 120 | 120 | 70 | 70 | 130 | 120 | 140 | 100 |
| Properties of prepreg | Degree of impregnation φ (%) of thermosetting resin composition in prepreg | | 90 | | 73 | | 8 | | 96 | | 93 | |
|  | Shift parameter σ | | 0.01 | | 0.05 | | 0.03 | | 0.36 | | 0.47 | |
|  | Penetration coefficient K in in-plane direction (m$^2$) | | $4.0 \times 10^{-15}$ | | $2.9 \times 10^{-14}$ | | — | | $4.2 \times 10^{-15}$ | | $5.4 \times 10^{-15}$ | |
|  | Handleability | | A | | A | | D | | A | | A | |
| Properties of reinforced fiber composite material | Void fraction (%) | | 7.9 | | 4.2 | | — | | 8.7 | | 4.5 | |
|  | CAI (Mpa) | | 181 | | 240 | | — | | 165 | | 172 | |

DESCRIPTION OF REFERENCE SIGNS

1: Epoxy resin composition
2: Thermoplastic resin insoluble in epoxy resin
3: Inter-formative layer
4: Epoxy resin layer
5: Reinforced fiber
6: Reinforced fiber layer
7: Un-impregnated layer
8: Equally dividing line
9: Laminate of prepregs
10: Sealant
11: Cover film
12: Metal plate
13: Glass tape
14: Air flow meter
15: Permeability
16: Pressure gauge
17: Vacuum pump

The invention claimed is:

1. A prepreg comprising:
reinforced fibers [A] arranged in a layer form,
an epoxy resin composition containing an epoxy resin [B] and a hardener [C], the epoxy resin composition being partially impregnated into the reinforced fibers [A], and a thermoplastic resin [D] that is insoluble in the epoxy resin [B] and is localized at a surface on one side of the prepreg,
wherein the prepreg has a degree of impregnation $\varphi$ with the epoxy resin composition of 30 to 95%,
in a layer of the reinforced fibers [A], a region un-impregnated with the epoxy resin composition shifts to the side where the thermoplastic resin [D] is localized, and
the prepreg has a shift parameter $\sigma$ that defines a degree of the shift in a range of $0.10<\sigma<0.45$.

2. The prepreg according to claim 1, having an in-plane air permeability coefficient K of $2.0\times(1-\varphi/100)\times10^{-14}$ [m$^2$] or more.

3. The prepreg according to claim 1, wherein the reinforced fibers [A] are continuous fibers that are arranged unidirectionally.

4. The prepreg according to claim 1, wherein the reinforced fibers [A] are in a form of a woven fabric.

5. The prepreg according to claim 1, the epoxy resin composition is partially impregnated into the reinforced fibers [A] on both sides of the reinforced fibers [A].

* * * * *